Sept. 23, 1941.  A. MICHAILOFF  2,256,988
APPARATUS FOR MAKING FLUID COUPLINGS
Filed Dec. 9, 1938  3 Sheets-Sheet 1
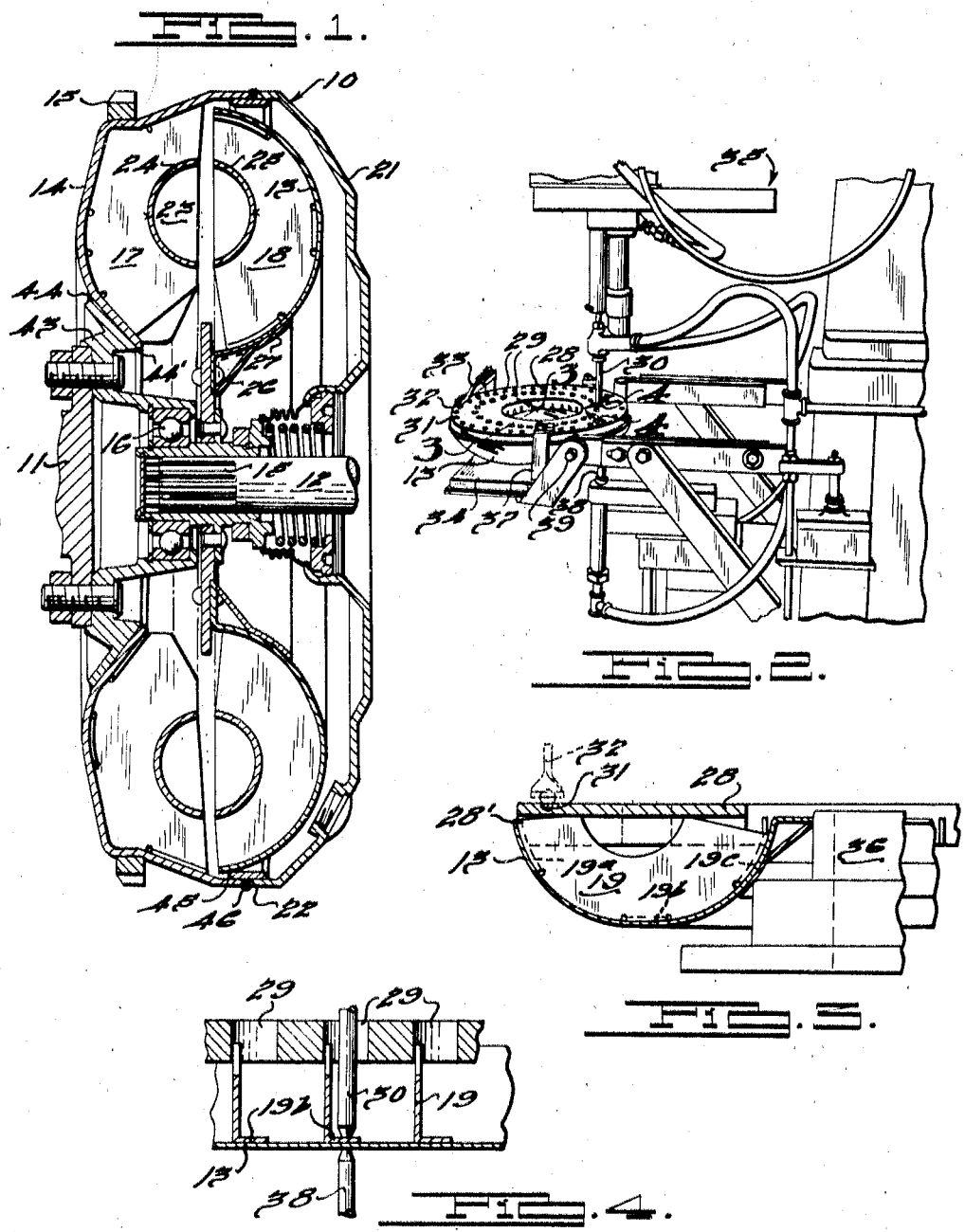
INVENTOR
Alexander Michailoff.
BY Hamess, Lind, Patee & Harris
ATTORNEYS.

Sept. 23, 1941.  A. MICHAILOFF  2,256,988
APPARATUS FOR MAKING FLUID COUPLINGS
Filed Dec. 9, 1938  3 Sheets-Sheet 2
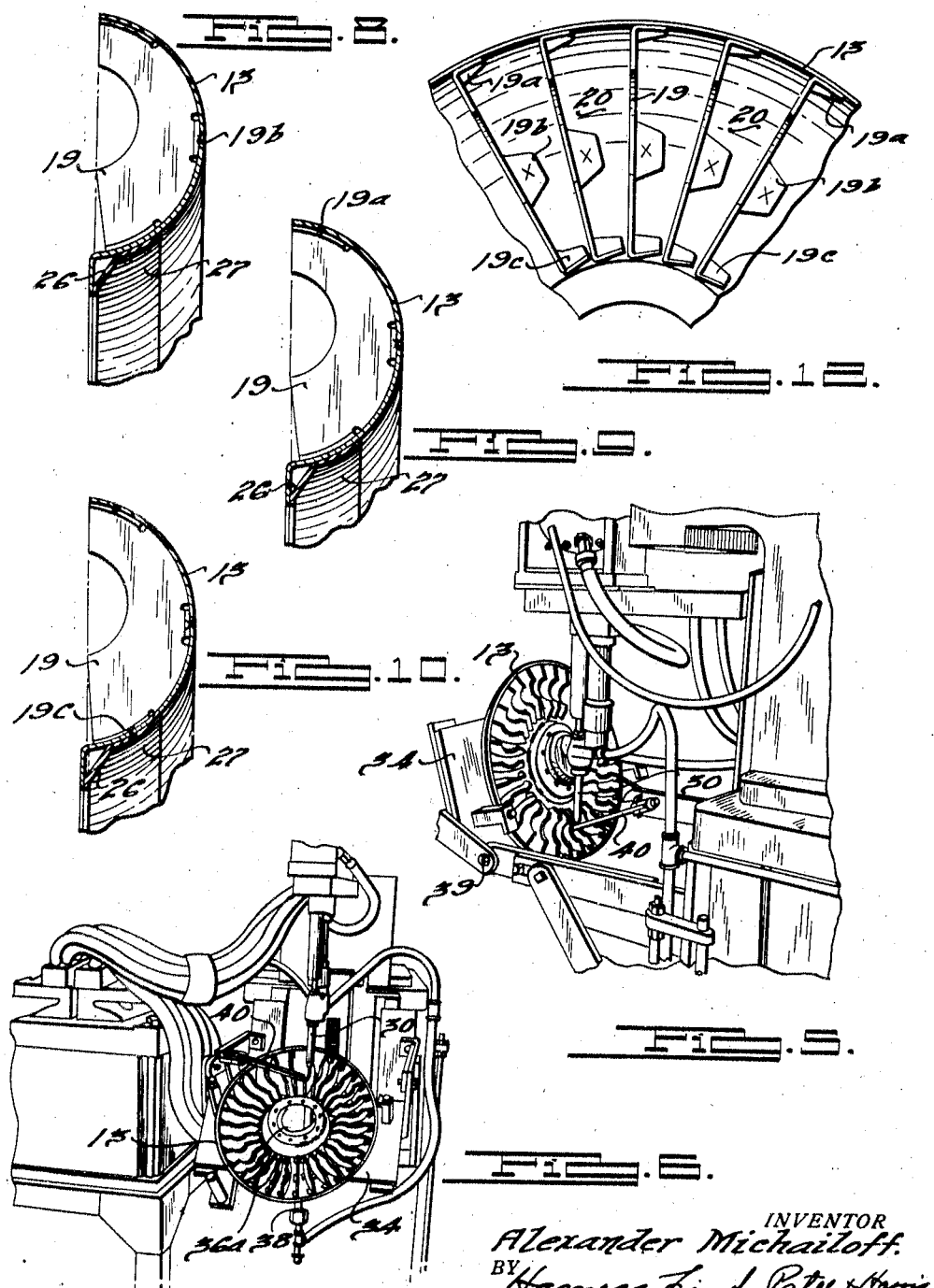
INVENTOR
Alexander Michailoff.
BY Harness, Lind, Patte & Harris
ATTORNEYS.

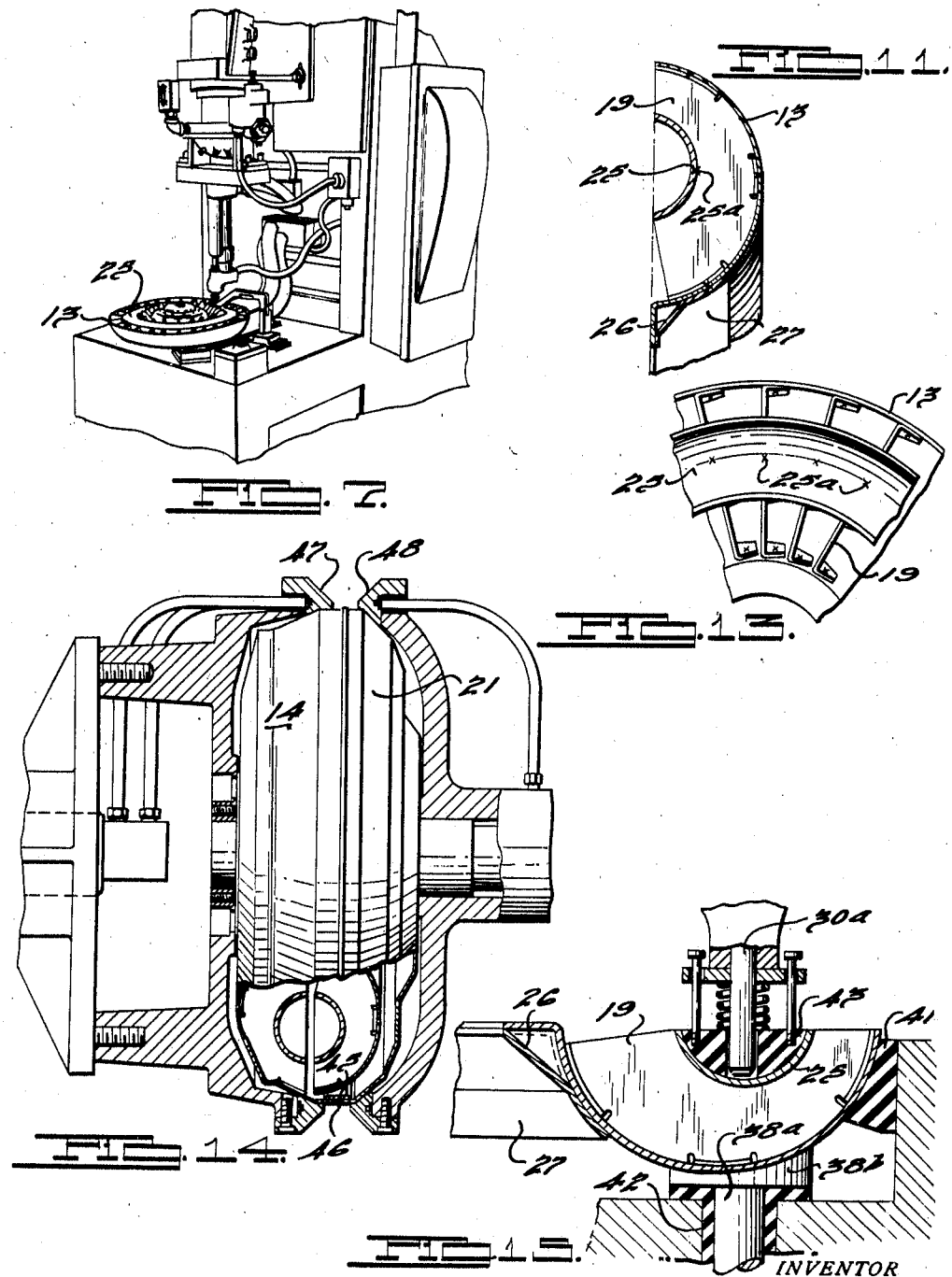

Patented Sept. 23, 1941

2,256,988

UNITED STATES PATENT OFFICE 2,256,988

APPARATUS FOR MAKING FLUID COUPLINGS

Alexander Michailoff, Grosse Pointe Farms, Mich., assignor to Chrysler Corporation, Highland Park, Mich., a corporation of Delaware Application December 9, 1938, Serial No. 244,757

3 Claims. (Cl. 219—17)

This invention relates to apparatus for making fluid couplings.

More particularly, it pertains to apparatus for quickly and economically welding the vane members of the coupling to the bottom and sides of the dished portions of the impeller and runner respectively.

Briefly, fluid couplings consist of a pair of rotatable members, i. e., a primary or impeller member and a secondary or runner member. In use, the impeller is connected to the drive shaft of the prime mover and the runner is connected to a power output shaft. For some time it has been realized that fluid couplings possess advantages which make them particularly adaptable for use in automotive vehicles, as well as for use in general industrial applications, but their relatively great weight and high cost has retarded their development for such purposes.

It is the principal object of the present invention to overcome the above mentioned difficulties by providing apparatus for manufacturing fluid couplers quickly and economically, which coupling is light in weight but strong enough to withstand the severe operating conditions which it is required to undergo.

Another object of the invention is to provide apparatus for welding the fluid directing vanes to the coupling members in a rapid and inexpensive manner.

For a specific embodiment of the invention, reference is made to the accompanying drawings in which like reference characters designate like elements in the following description:

Fig. 1 is a sectional view axially through a fluid coupling of the type mentioned herein.

Fig. 2 is a perspective view of the apparatus showing the positions of the parts during the first welding operation.

Fig. 3 is a sectional view along the line 3—3 of Fig. 2.

Fig. 4 is a sectional view along the line 4—4 of Fig. 2.

Fig. 5 is a perspective view of the apparatus showing the positions of the parts during the second welding operation.

Fig. 6 is a perspective view of the apparatus showing the positions of the parts during the third welding operation.

Fig. 7 is a perspective view of the apparatus showing the positions of the various parts during the fourth welding operation.

Figs. 8, 9, 10 and 11 are sectional views through the coupler element showing the welds performed by the operations illustrated in Figs. 2, 5 and 6, respectively.

Fig. 12 is a fragmentary plan view of the coupler element before the torus ring has been installed.

Fig. 13 is a fragmentary plan view of the coupler element after the torus ring has been installed.

Fig. 14 is a view in section of another type of welding apparatus which is utilized for securing together the two parts of the impeller housing.

Fig. 15 is a fragmentary sectional view of the apparatus showing the positions of the parts during the welding of the torus ring in place.

In the fluid coupling illustrated in Fig. 1 of the drawings, which is generally designated by the numeral 10, a driving shaft 11 is drivingly connected by bolts to the impeller or driving member 14 of the coupling. The impeller 14 has starter teeth 15 around its outer periphery which are adapted to mesh with the usual engine starting device (not shown).

The driven shaft 12 corresponds to the driving shaft which ordinarily connects the clutch of a motor vehicle to the transmission mechanism thereof. The runner or driven member 13 of the fluid coupling is drivingly connected to the shaft 12 by means of the splines 15. The runner member 13 is mounted for rotational movement relative to the impeller 14 by means of the anti-friction bearing 16.

Both the impeller and runner members have annularly dished working chambers 17 and 18 respectively, in which are disposed a plurality of radially extending vanes 19 (see Fig. 12) which form a plurality of radial passages 20 through which the pressure fluid circulates as is well known in the art.

The vortex chamber 23 of the coupler is formed by a pair of trough-shaped annuli 24 and 25 which are welded to cut out portions of the vanes of the impeller and runner respectively. An annular reinforcing member 26 is welded to the outside of the runner 13 at 27.

The impeller 14 has a complementary housing portion 21, welded thereto at 22, which forms an enclosure for the working parts of the coupling.

If desired, the annuli 24 and 25 which form the torus ring may be omitted along with the vortex chamber 23 and the vanes 19 formed with straight inner edges.

The rest of the mechanism shown in Fig. 1 will not be described inasmuch as it has no bearing on the subject matter of the present invention.

Fig. 2 illustrates the position of the runner 13 with respect to the welding apparatus at the time of the first operation. As is apparent from the figures, each of the vanes 19 is provided with three welding tabs 19ª, 19ᵇ and 19ᶜ respectively, which are formed integrally therewith and bent at right angles thereto. Preparatory to the first welding operation, the runner vanes 19 are assembled upside down, in their respective proper positions, in the grooves 28' of fixture 28. The fixture 28 consists of an aluminum ring of such size and shape that it will readily fit inside the runner (see Fig. 3). The ring 28 has a plurality of radial grooves 28' spaced equally around its bottom side (see Figs. 2 and 3). Ring 28 is also provided with a plurality of holes 29 through which the upper welding electrode 30 is adapted to be inserted, and a plurality of drill spots 31 which are adapted to receive the index ball at the bottom of the adjustable indexing arm 32. The number of holes 29 and drill spots 31 must correspond to the number of grooves 28' in ring 28. In the illustrated example thirty grooves, holes and spots are provided because there are thirty vanes in the runner.

In assembling the vanes preparatory to the first welding operation, the aluminum ring 28 is placed on a bench with the grooved side turned upwardly and a vane member is placed in each groove and properly oriented therein. The runner shell 13 is then dropped over the whole assembly and the assembly is turned over and placed on the platen 34 of the welding apparatus, which is designated generally by the numeral 35, where it is retained thereon by the hub 36 and the clamps 37. The hub 36 and clamps 37 are so constructed that they provide a rigid support for the runner assembly yet allow rotation thereof about hub 36. The ball 31 of the indexing arm 32 is then dropped into one of the drill spots 31 and the runner assembly is ready for the first welding operation which consists of welding the tab 19ᵇ of each of the vanes to the bottom of the runner shell.

The lower welding electrode 38 is arranged coaxially with the upper electrode 30 and is adjusted so that it will contact with the outside surface of the runner shell at all times.

In performing the first operation on the runner the sequence of operations is as follows: The upper electrode 30 is lowered through one of the holes 29 into contact with tab 19ᵇ of one of the vanes 19 (see Fig. 4). This may be accomplished by means of a fluid pressure cylinder operated by a foot treadle as is customary in welding practice, or by other means. As the electrode 30 contacts tab 19ᵇ, the electrical circuit is automatically completed and the welding current flows through the electrodes 30 and 38 and through the tab 19ᵇ and the shell 13 thereby making a spot weld. The operator then releases the foot treadle (or other control means) and the electrode 30 is withdrawn from the hole 29. The arm 33 is then lifted, withdrawing the ball 32 from the drill spot 31, and the entire assembly is rotated around hub 36 to position the next circumferentially adjacent hole 29 beneath the electrode 30. The latter operation is accomplished in a semi-automatic manner inasmuch as the ball 32 will drop into the next circumferentially adjacent drill spot 31, if the arm 33 is dropped immediately after the assembly is rotated sufficiently to prevent ball 32 from dropping back into the same spot that it was withdrawn from. In the modification shown, the assembly will, of course, be rotated one-thirtieth of a revolution because there are thirty vanes to be welded. The runner assembly is now in position for another weld to be made and the above detailed sequence of operations is repeated successively until all of the vanes 19 have been welded to the runner shell 13 at the point 19ᵇ (see Fig. 8).

Fig. 5 shows the position of the runner assembly during the second welding operation during which the tabs 19ª are welded to runner shell adjacent its outer rim (see Fig. 9). It will be noted in Fig. 5 that the aluminum ring 28 has been removed, it no longer being necessary because the vanes 19 are now firmly fixed in place by the weld 19ᵇ. The platen 34 has been pivoted upwardly about its support 39 to such position that the tabs 19ª may be brought successively into line with the electrodes 30 and 38 in a manner similar to that illustrated in Fig. 4. The indexing arm 33 has been removed from the platen and another indexing arm 40 has been substituted against which the vane to be welded is located each time a weld is made. It will be understood that the tabs 19ª are welded, each in succession, in a manner similar to that described above in connection with the welding of the tabs 19ᵇ.

After tabs 19ª have been welded, the platen is swung downwardly about its pivot axis 39 as shown in Fig. 6 in preparation for the third welding operation which consists of welding each of the tabs 19ᶜ and the reinforcing ring 26 to the runner shell near its central opening.

As shown in Fig. 6, the lower electrode 38 is adjusted to protrude upwardly through the cutout portion 36ª of the hub 36 and into contact with the reinforcing ring 26 at a point directly beneath one of the tabs 19ᶜ. The same technique is followed in this operation as was followed above in making the weld 19ª, but in this case, the welding current passes through the ring 26 as well as through the runner shell and the vane tab, thereby resulting in the simultaneous welding of the ring and tab to the shell. The reinforcing ring 26 is welded to the shell in as many places as there are vanes (thirty in this embodiment) thereby providing a strong and rigid structure.

The fourth welding operation consists in welding the torus ring 25 in place. For this operation (see Fig. 15) the runner is preferably removed to a special apparatus which is generally similar to the welding apparatus described above but differs in a few details. The runner is held in place upon the apparatus by means of a fibre adapter 41 which insulates the runner from the metal parts thereof. The bottom electrode 38ª has a shoe 38ᵇ on which the bottom of the runner shell that is adjacent the welding zone rests. A fibre insulating washer 42 insulates the electrode and shoe from the metal parts. The torus ring is pressed firmly in place by the spring pressed fibre pad 43 which is mounted on the fixture supporting the upper welding electrode 30ª, as shown in Fig. 15. The torus ring is welded to each of the vanes 25 by successively bringing the electrode 30ª into contact with the torus ring at a point directly over each of the vanes and applying curent for a time sufficient to make the weld. Suitable indexing means such as that shown in Figs. 5 and 6 may be used. In this operation the welding current passes from the electrode 30ª to the shoe 38ᵇ through the vane 19.

The impeller 14 is assembled and welded in a manner similar to that described above in connection with the runner except of course, the impeller has no reinforcing ring similar to member 26 so the third welding operation on the impeller involves only the welding of the vane tab to the shell. The impeller hub member 43 is welded to the outer side of the member by a pair of seam welds designated as 44 and 44' in Fig. 1 of the drawings.

After the various parts of the runner and impeller have been welded in place, the two members are assembled together with the complementary housing member 21 of the impeller upon a jig as shown in Fig. 14. A ring 45 provided with an integral ridge 46 on its outer periphery is assembled with the members in such manner that the ridge 46 separates the members 14 and 21 as shown in Figs. 1 and 14. Ring 45 prevents the arc which is usually present along the irregular edge portions of the housing 14 and 21 during the welding period from entering the interior of the coupler and causing damage. It forms a reinforcement in the completed structure.

The water cooled annular electrodes 47 and 48 are adapted to contact the members 14 and 21 along their entire periphery in the vicinity of the ring 45 and are adjusted to urge the members 14 and 21 toward each other while current is applied for a time sufficient to form a strong weld between the ridge 46 and each of the members 14 and 21.

The above description is intended to be illustrative only, it being understood that various modifications in the apparatus and/or technique employed may be made without departing from the spirit or the scope of the invention as defined in the claims annexed hereto.

I claim:

1. A fixture for holding a plurality of sheet metal vane members while said members are being welded to the inner dished portion of an annular housing member comprising an annular member provided on one face thereof with a plurality of circumferentially spaced, radially extending slots, a plurality of holes extending axially through said member adjacent said slots for accommodating insertion of a welding electrode, and a plurality of indexing spots arranged on the other side of said member and adapted for engagement by indexing mechanism during welding.

2. A fixture for holding a plurality of sheet metal vane members while said members are being welded to the inner dished portion of an annular housing member comprising an annular member provided on one surface thereof with a series of radially extending slots circumferentially spaced around the axis thereof, a series of holes extending axially through said member adjacent said slots for accommodating insertion of the welding tool, and a series of drill spots disposed around said axis in radial alignment with said holes in the opposite surface thereof, said spots being adapted for engagement by indexing mechanism.

3. A fixture for facilitating the manufacture of fluid couplings and the like, comprising an annular member provided with a series of radially extending slots spaced circumferentially around the axis thereof and adapted to receive sheet metal vanes thereby to hold the same in position for welding to a dished housing, a series of holes disposed adjacent said slots for accommodating insertion of a welding tool, and a plurality of indexing spots arranged around the axis of said member on one side thereof.

ALEXANDER MICHAILOFF.